US006234638B1

(12) United States Patent
Beverly (10) Patent No.: US 6,234,638 B1
(45) Date of Patent: May 22, 2001

(54) PHOTOGRAPHIC LIGHT DIFFUSING REFLECTOR

(76) Inventor: Isaac Beverly, 2655 N. State Hwy. 3, North Vernon, IN (US) 47265

( * ) Notice: Subject to any disclaimer, the term of this patent is extended or adjusted under 35 U.S.C. 154(b) by 0 days.

(21) Appl. No.: 09/281,187

(22) Filed: Mar. 30, 1999

Related U.S. Application Data (60) Provisional application No. 60/083,285, filed on Apr. 28, 1998.

(51) Int. Cl.$^7$ ................................................ G03B 15/06
(52) U.S. Cl. ............................................. 362/16; 362/3
(58) Field of Search ................................... 362/3, 16, 17, 362/18, 445

(56) References Cited

U.S. PATENT DOCUMENTS

| | | | |
|---|---|---|---|
| D. 342,273 | 12/1993 | Couch | D16/37 |
| 1,283,963 | * 11/1918 | Takahashi | 359/892 |
| 2,260,712 | * 10/1941 | Harrison | 359/892 |
| 3,712,978 | * 1/1973 | Lowell | 362/16 |
| 3,781,535 | 12/1973 | Larson | 362/18 |
| 4,078,170 | 3/1978 | Sloop | 362/16 |
| 4,446,506 | * 5/1984 | Larson | 362/17 |
| 4,460,946 | * 7/1984 | Tinz | 362/17 |
| 4,524,405 | 6/1985 | Heard | 362/18 |
| 4,633,374 | 12/1986 | Waltz et al. | 362/17 |
| 4,807,089 | * 2/1989 | Nusseli | 362/17 |
| 5,154,503 | 10/1992 | Sternsher | 362/16 |
| 5,311,409 | 5/1994 | King | 362/17 |
| 5,436,804 | 7/1995 | Henry | 362/16 |
| 5,651,602 | * 7/1997 | Tawil et al. | 362/18 |
| 6,102,556 | * 8/2000 | Lieberman et al. | 362/16 |

FOREIGN PATENT DOCUMENTS

987861 * 3/1965 (GB) ................................... 362/17

* cited by examiner

Primary Examiner—Sandra O'Shea
Assistant Examiner—Peggy A Neils
(74) Attorney, Agent, or Firm—Brinks Hofer Gilson & Lione (57) ABSTRACT

Apparatus for use with a light source including a ring reflector having an rim projecting outwardly from the light source for directing light from the source in a first direction, includes, a support, and a frame connected to the support and adapted to extend over the ring reflector to support a sheet of material in a position relative to the light source to redirect a substantial portion of the light from said first direction to a second direction. The support is coupled to the light source by a strap having two leg portions joined together by a bight portion, the two leg portions terminating at a first end coupled to the support so that the leg portions extend laterally on opposite sides of the ring reflector, each leg portion including a longitudinal slot for engaging said rim, the bight portion spacing the leg portions from each other by a distance less than a diameter of said rim, the leg portions being elastically displaceable to a distance greater than said diameter for engagement with the rim so that the apparatus is coupled in operative position relative to the light source.

20 Claims, 6 Drawing Sheets

PHOTOGRAPHIC LIGHT DIFFUSING REFLECTOR

CROSS-REFERENCES TO RELATED APPLICATION

The present application is related to U. S. Provisional Application No. 60/083,285 filed Apr. 28, 1998, which is hereby incorporated by reference.

BACKGROUND OF THE INVENTION

The present invention relates to reflectors for lights generally employed by professional photographers, and particularly relates to supporting structure for supporting such reflectors in the immediate area of photographic strobe lights.

In professional photography and graphic arts, indirect lighting effects are employed to produce reduced shadows and highlighting on a subject or area. The indirect lighting effects are commonly achieved by coupling an artificial light source such as an electronic flash or incandescent headlight to a diffuse reflector. The reflector is then situated so that the reflected light is directed onto the surface of the subject sought to be depicted. This light is often referred to as "bounce" light.

Bounce light is often achieved through the use of fabric reflectors which are fan-shaped or umbrella-shaped. The initial source of the bounce light is typically a flash or strobe which is mechanically connected to the center pole of the umbrella, the light being directed from the source toward the interior surface of the umbrella. The umbrella and source are then coupled to a stand or support which can be of a variety of shapes and heights and it is usually adjustable to suit various photographic situations. A representative example of an umbrella-type reflector is that shown in Waltz, et al., U.S. Pat. No. 4,633,374. Another example of an umbrella-type reflector, which is mechanically coupled to a camera, is shown in Larson, U.S. Pat. No. 3,781,535.

A fan-type reflector can be thought of as merely a portion of an umbrella-type reflector wherein the reflecting surface is supported on a plurality of radial arms extending outward from a laterally positioned yet central point which also provides an axis for a support for the fan-shaped reflector. Again, the source of light is coupled or arranged with respect to the fan reflector so that light from the source is directed initially toward the fan-shaped reflector and the reflected or bounce light is directed toward the subject sought to be photographed. An example of such a fan-shaped reflector is found in Heard, U.S. Pat. No. 4,524,405.

Planar reflectors having diffuse surfaces are also known in the prior art and used in connection with sources to achieve the desired diffuse bounce light. The character of the surface of such planar reflectors has to be carefully controlled to avoid any specular reflection which tends to highlight hard edges and not achieve the desired lighting effect. Such planar reflectors are usually self-supporting on stands which are situated adjacent to light sources so that the source of light is directed toward the planar surface to produce bounce light directed toward the object sought to be photographed. An example of a substantially planar light modifying screen is found in Henry, U.S. Pat. No. 5,436,804. Another example of a substantially planar light modifying screen mechanically coupled to a camera is found in Sloop, U.S. Pat. No. 4,078,170.

While each of the prior art devices has achieved the overall objective of providing bounce light which can be directed toward a subject, often the apparatus requires considerable manipulation and assembly in order to direct the light in the appropriate direction. Further, the devices are complicated to manufacture and often awkward to set up or assemble at the point of use. Accordingly, it is an object of the present invention to achieve a novel design for an indirect lighting reflecting which is easy to manufacture, compact when not in use, and simple to set up at the point of use.

SUMMARY OF THE INVENTION

The present invention is essentially an apparatus for use in connection with a light source, the light source including a generally ring-shaped reflector having a rim and projecting outwardly from the light source for directing light from the source in a first direction. In the absence of a ring reflector, a circular ring-like bracket can be positioned in front of the light source so that the principal direction of the light emanating from the source travels axially through the ring-like bracket.

The apparatus for use with the light source comprises a support and a frame connected to the support adapted to extend over the ring-like reflector to support a sheet of material in a position relative to the light source to redirect a substantial portion of the light from the direction of initial travel of the light to a second direction. The sheet of material can be of any desired shape and curvature as best suited to the photographic situation in which the apparatus is to be employed. In a preferred embodiment, sheet of material is planar in character having a diffuse surface so that specular reflection of the light from the initial direction to the second direction is avoided.

The apparatus further includes a pair of straps, a first end of each strap being coupled to the support so that the straps extend laterally on opposite sides of the ring reflector or ring-like bracket. Each strap includes a longitudinal slot for engaging the rim of the ring-like reflector or the rim of the ring-like bracket. The engaging relationship between the straps and the rim of the reflector or bracket couples the apparatus in operative position relative to the light source in a simple, uncomplicated manner so that positioning of the reflector relative to the light source is facilitated.

In the preferred embodiment, each of the pair of the straps includes a second end, the second ends being connected to each other in a spaced apart relationship at a distance less than the diameter of the rim, the straps being elastically displaceable to a distance greater than the diameter across the rim so that the longitudinal slots can be engaged with the rim. In a preferred embodiment, the pair of straps are two portions of a single strap-forming member unitarily joined together at the second end by a bight portion.

The apparatus can also include a spill guard coupled to the supporting strap at a position remote from the support to prevent the transmission of unreflected light from the light source in the second direction toward the subject to be photographed. The spill guard is most conveniently coupled to the strap by means of a permanent magnet.

The support preferably takes the form of a box-like casing having a first two opposing sides for engaging the first ends of the pair of straps and at least one other side including structure for engaging the frame supporting the sheet of material over the light source. The supporting structure of the box-like casing for engaging the frame preferably includes a set of holes for receiving an end portion of the frame. The box-like casing can also include locking elements for locking the box-like casing and reflecting sheet supporting frame together. While the reflecting sheet supporting frame can be of a variety of shapes, in a preferred embodiment, the frame comprises a perimeter-defining element having two end portions adjacent to each other adapted to be coupled to the support. In the preferred embodiment, the sheet material comprises a fabric material including a plurality of straps for connecting the fabric material sheet to the frame.

One feature of the present invention is the compact arrangement of the pair of straps when the object is collapsed ready for transport or storage. Another feature of the present invention is the simplicity of set up and coupling of the reflector to the light source which is achieved by merely deflecting the straps elastically to opposite sides of the rim of the reflector or ring-like bracket situated in the immediate vicinity of the light source, the straps being received on the rim or bracket by inter-engagement with the slots present in the straps.

Other features and advantages of the present invention will become apparent to those skilled in the art and upon consideration of the following description of the preferred embodiment which is illustrated in the accompanying figures.

DESCRIPTION OF A PREFERRED EMBODIMENT

Figure 1:
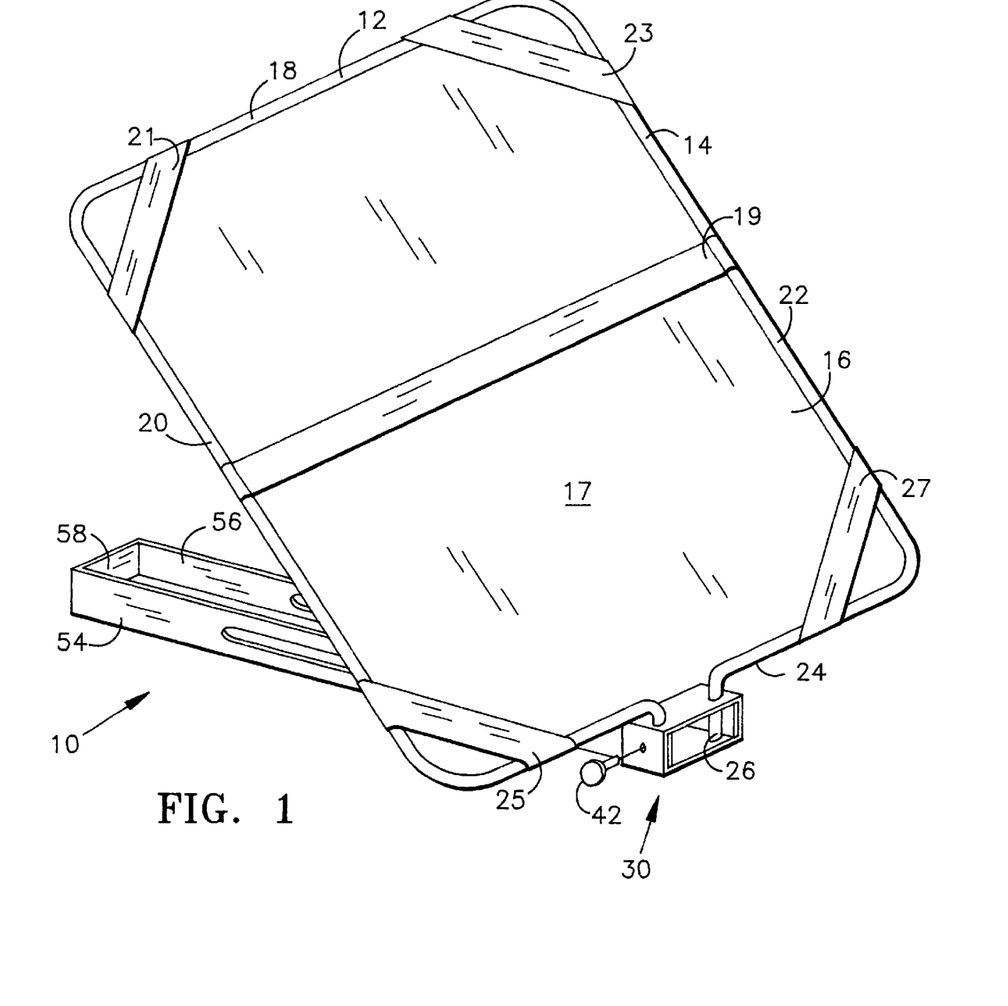
FIG. 1 is a perspective view of a photographic light diffusing reflector constructed in accordance with the present invention.

A light diffusing reflector 10, in accordance with the present invention, is shown in the accompanying figures to comprise a rod 12 which is bent in a generally rectangularly shaped form to define the perimeter 14 of a reflecting member 16. The rod 12 includes a distal side 18, a pair of lateral sides 20 and 22, and a proximal side 24. The proximal side 24 includes the two opposite ends 26 and 28 of rod 12 which are situated adjacent to each other and are engaged in a supporting bracket 30. The reflecting member 16 comprises a generally planar sheet 17 of a suitable fabric. A belt 19 couples the middle of the planar sheet 17 to the two lateral sides 20 and 22. Four elastic corner straps 21, 23, 25, and 27 couple the four corners of the planar sheet 17 to the rod 12 at the four corners of the general rectangular perimeter 14.

The supporting bracket 30 comprises a box-like casing 32 having a first pair of opposing sides 34 and 36 joined together by a second pair of opposing sides 38 and 40. Each of the first pair of opposing sides 34 and 36 includes a threaded opening for receiving thumb screws 42 and 44. Both of the second pair of opposing sides 38 and 40 include openings 46, 48, 50 and 52 for receiving the two opposite ends 26 and 28 of rod 12 which are situated adjacent to each other when they are engaged in the supporting bracket 30. The threaded openings are situated such that distal ends of the thumb screws 42 and 44 engage the ends 26 and 28 of rod 12 to secure the perimeter frame 14 to the casing 32.

A pair of straps 54 and 56 engage the opposing sides 34 and 36 to project forward therefrom under the overhanging reflecting member 16. The straps 54 and 56 are unitarily joined together by a bight portion 58 at a forward end 60 of the straps. The straps 54 and 56 as well as bight portion 58 are constructed of a strong, elastic material such as spring steel strapping. Each of the straps 54 and 56 includes a longitudinal slot 62.

The steps of assembly of a light diffusing reflector 10, in accordance with the present invention, is shown in FIGS. 2 through 6. The steps of assembly is shown in relation to a photographic strobe light 100 that includes a ring reflector 102 having a rim 104 projecting generally outwardly from the light 100. It will be appreciated that the strobe light 100 and ring reflector 102 including the rim 104 do not form any part of this invention but rather illustrate the preferred use for the present invention. The photographic strobe light can be mounted in any suitable position by conventional means relative to a camera and a subject sought to be photographed.

Figure 2:
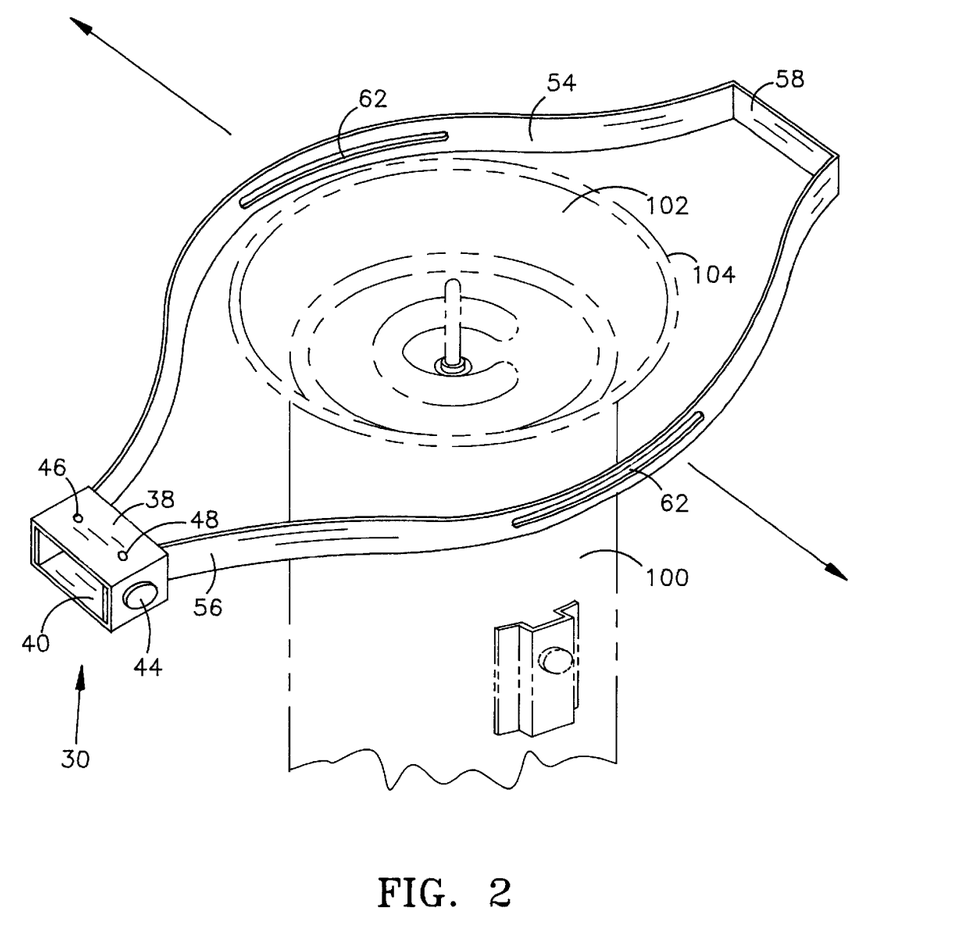
FIG. 2 is a perspective view of the support and strap portion of the apparatus shown in FIG. 1 as the strap is outwardly elastically displaced for engagement with a rim of a reflector connected to a photographic strobe light.

The steps of assembly proceed by first elastically displacing the straps 54 and 56 outward by a distance sufficient to exceed a diameter of the rim 104 as shown in FIG. 2. The straps 54 and 56 are then positioned on opposite sides of the ring reflector 102 so that the longitudinal slots 62 are aligned with the rim 104.

Figure 3:
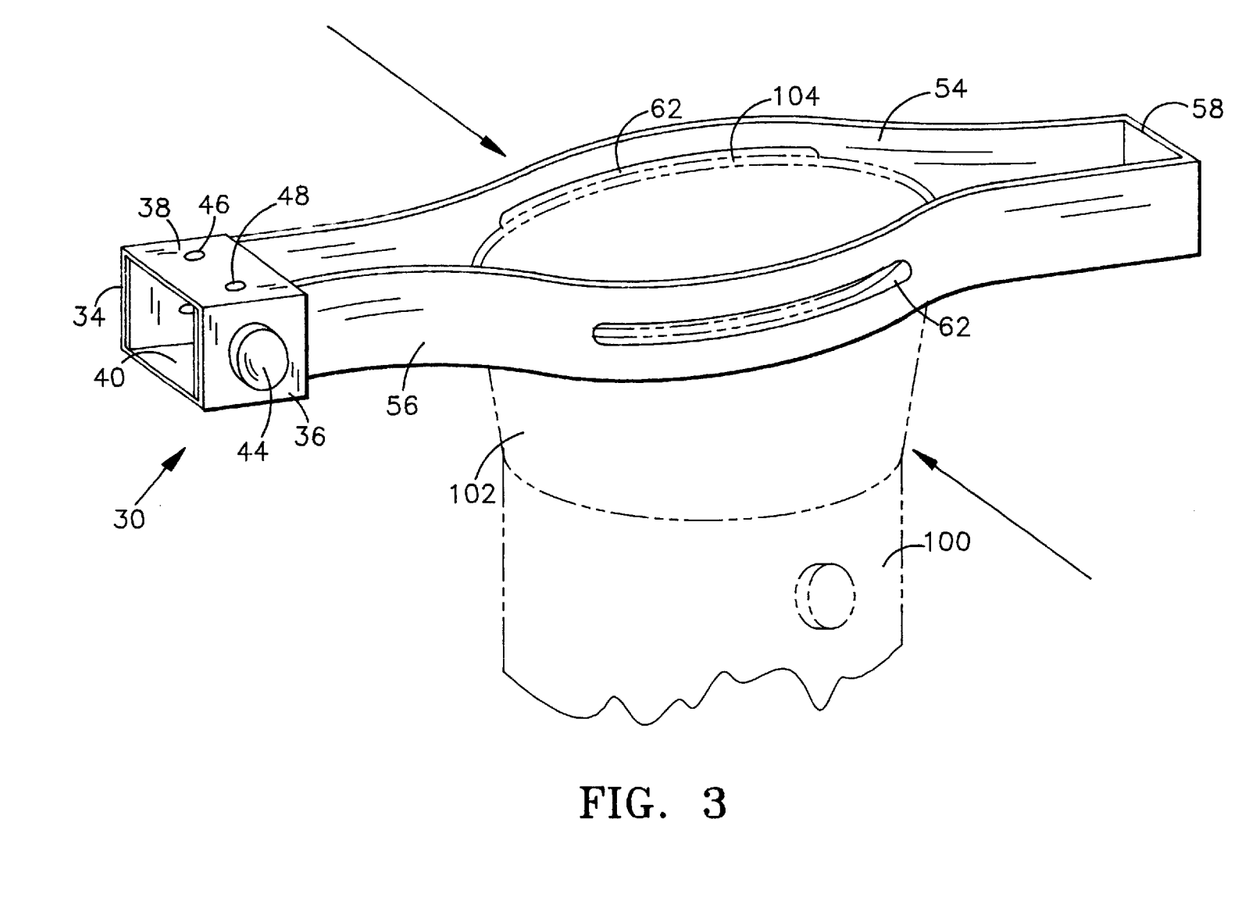
FIG. 3 is a perspective view of the strap and support shown in FIG. 2 upon release of the strap which elastically clamps on opposite sides of the reflector rim.
Figure 4:
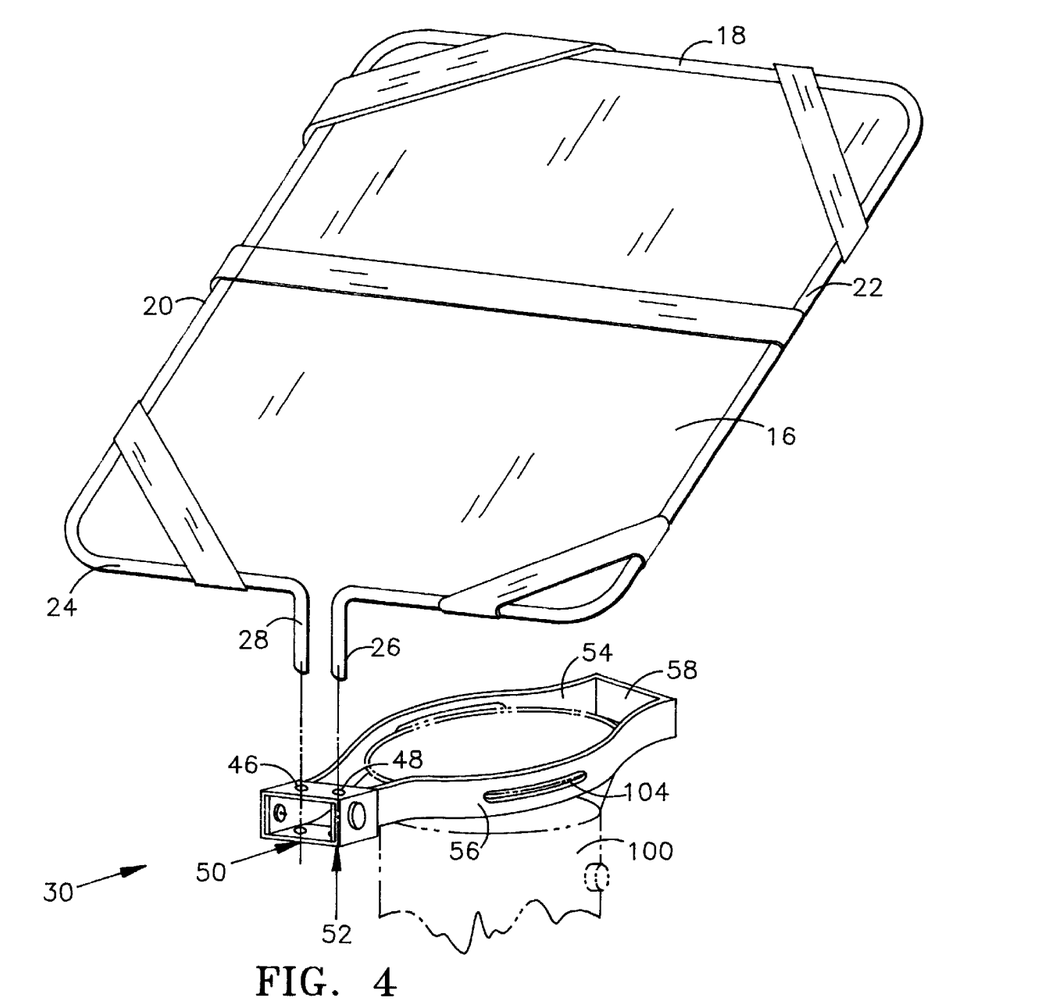
FIG. 4 is a perspective view of the apparatus showing engagement of the reflector frame and sheet with the support following engagement with the light source.

The straps 54 and 56 are then allowed to elastically retract toward each other as shown in FIG. 3 so that the rim 104 of the ring reflector 102 is received in the longitudinal slots 62. It will be appreciated that most desirably the width of the longitudinal slots 62 is such that when they receive rim 104 there is essentially no play or slop between the straps 54 and 56 on the one hand and the light source 100 on the other.

Figure 5:
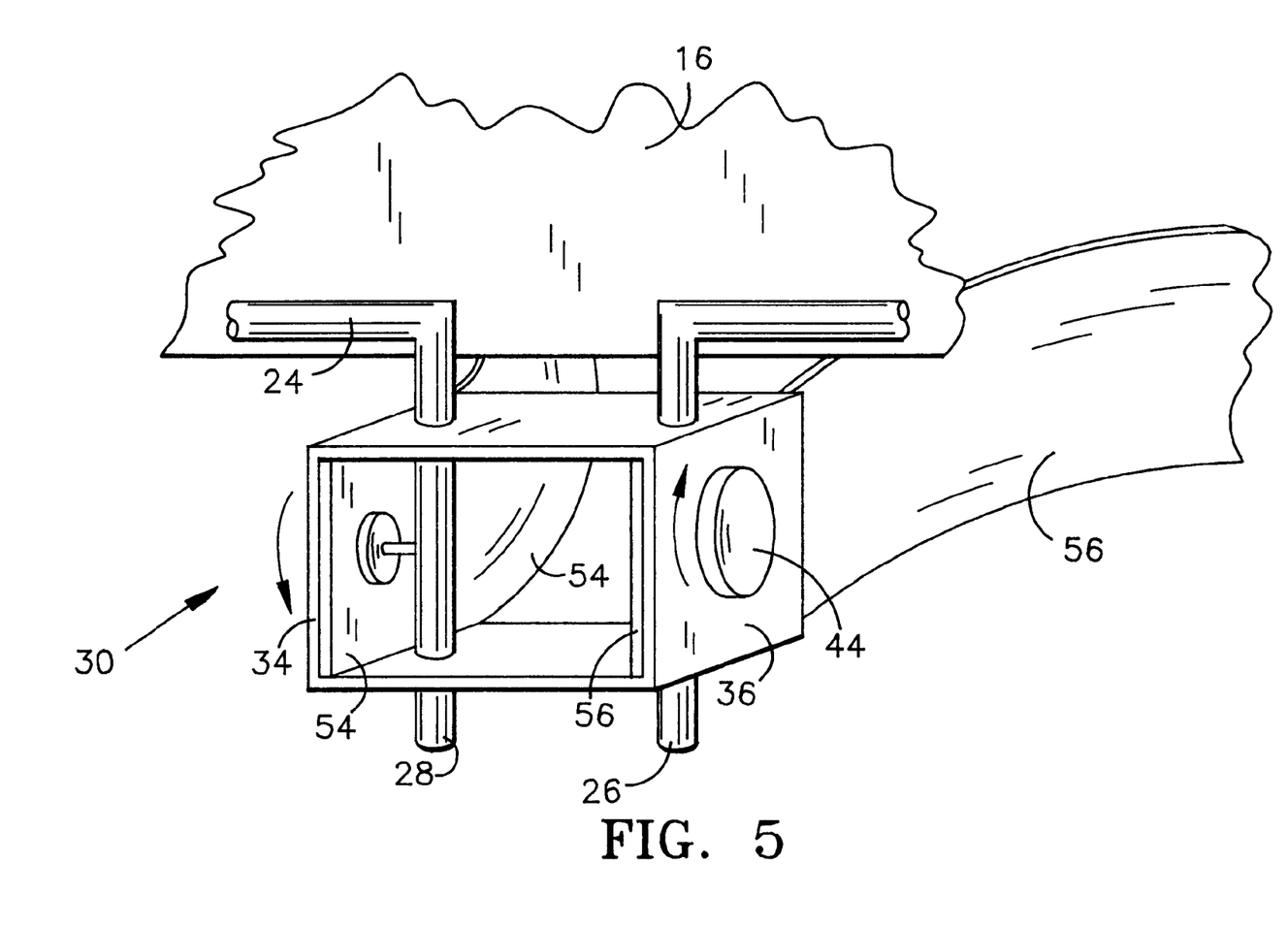
FIG. 5 is a detailed perspective view showing engagement between the reflector supporting frame and the support locking elements.

Next, the end portions 26 and 28 of rod 12, which defines the perimeter 14 of the reflecting member 16, are inserted into openings 46–52 in the opposing sides 38 and 40 of supporting bracket 30 so as to position the reflecting member 16 over the light source 100. While the end portions 26 and 28 are shown to be considerably shorter than the length of the proximal side 24, it will be appreciated that the length and spacing of the portions 26 and 28 is a matter of design. Once the end portions 26 and 28 are received in the openings 46–52, they are secured at a suitable position by tightening the thumb screws 42 and 44 as shown in FIG. 5.

Figure 6:
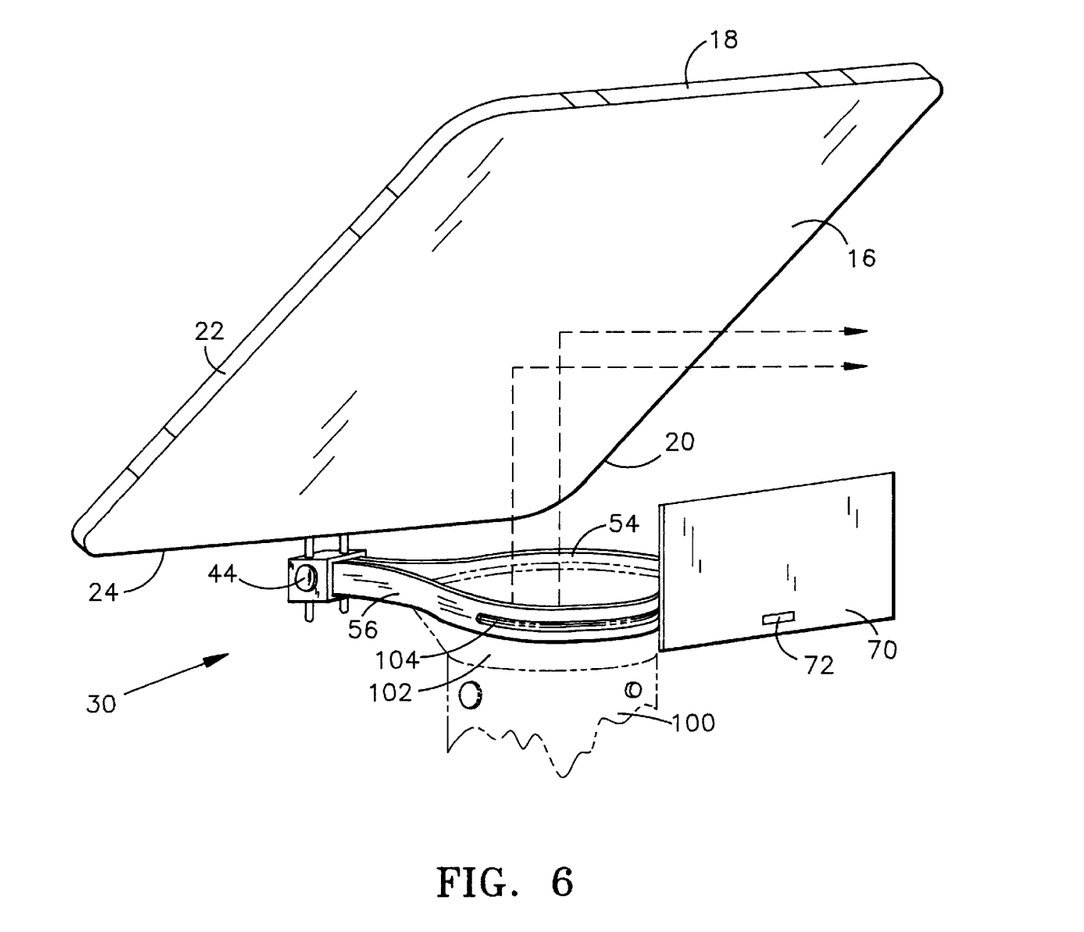
FIG. 6 is a perspective view of the apparatus of the present invention including a spill guard for preventing the transmission of unreflected light from the light source toward the subject sought to be photographed.

To complete the assembly, a spill guard 70 in the form of a rectangular, substantially opaque or light diffusing shield is coupled to the bight portion 58, as shown in FIG. 6, to prevent the transmission of unreflected light from the light source 100 toward the subject to be photographed. The spill guard 70 is most conveniently coupled to the bight portion 58 by a permanent magnet, which can take the form of a molded flexible sheet similar to that commonly employed for advertising and refrigerator magnets. Of course, other coupling means can be employed such as a simple paperclip or the like.

While the present invention has been described by reference to this preferred embodiment, it is clear that the present invention is susceptible to numerous modifications and embodiments within the ability of those skilled in the art and without the exercise of the inventive faculty. For example, the reflecting member 16 can take on shapes other than that illustrated, and can be coupled to supporting bracket 30 by means other than by the insertion of end portions portions 26 and 28 in the openings 46–52. Accordingly, the scope of the present invention is defined as set forth by the following claims and their equivalents.

What is claimed is:

1. Apparatus for use with a light source including a ring reflector having an rim projecting outwardly from the light source for directing light from the source in a first direction, the apparatus comprising:
    a pair of straps, each strap including a longitudinal slot for engaging said rim,
    a first and a second connecting element, each connecting element connecting adjacent ends of the pair of straps to each other, at least one of the first and second connecting elements including a support,
    a frame connected to the support extending over said ring reflector to support a sheet of material in a position relative to the light source to redirect a substantial portion of the light from said first direction to a second direction.

2. The apparatus of claim 1 wherein the first and second connecting elements connect adjacent ends of the pair of straps to each other in spaced apart relation by a distance less than a diameter of said rim, the straps being outwardly displaceable to a distance greater than said diameter.

3. The apparatus of claim 1 wherein the pair of straps comprise two portions of a single strap-forming member unitarily joined together at one end by a bight portion defining one of the connecting elements.

4. The apparatus of claim 3 further comprising a spill guard coupled to the bight portion for preventing the transmission of unreflected light from the light source in said second direction.

5. The apparatus of claim 3 wherein the single strap-forming member is composed of spring steel.

6. The apparatus of claim 1 wherein at least one of the first and second connecting elements comprises a box-like casing having a first two opposing sides engaging the pair of straps, and at least one other side including supporting structure for engaging said frame.

7. The apparatus of claim 6 wherein the supporting structure for engaging said frame comprises a set of aligned holes in a second two opposing sides of the box-like casing.

8. The apparatus of claim 1 wherein the frame comprises a perimeter-defining element having two ends adjacent to each other adapted to be coupled to the support.

9. The apparatus of claim 1 wherein the sheet material comprises a fabric material including a plurality of straps for connecting the fabric material sheet to the frame.

10. Apparatus for use with a light source including a ring reflector having an rim projecting outwardly from the light source for directing light from the source in a first direction, the apparatus comprising:
    a support, and a frame connected to the support and adapted to extend over said ring reflector to support a sheet of material in a position relative to the light source to redirect a substantial portion of the light from said first direction to a second direction,
    a pair of straps, a first end of each strap being coupled to the support so that the straps extend laterally on opposite sides of the ring reflector, each strap including a longitudinal slot for engaging said rim whereby the apparatus is coupled in operative position relative to the light source.

11. The apparatus of claim 10 wherein each of the pair of straps includes a second end, the second ends being connected to each other in spaced apart relation at a distance less than a diameter of said rim, the straps being elastically displaceable to a distance greater than said diameter for engagement with the rim.

12. The apparatus of claim 11 wherein the pair of straps comprise two portions of a single strap-forming member unitarily joined together at the second ends by a bight portion.

13. The apparatus of claim 11 further comprising a spill guard coupled to the strap second ends for preventing the transmission of unreflected light from the light source in said second direction.

14. The apparatus of claim 10 wherein the support comprises a box-like casing having a first two opposing sides engaging the first ends of the pair of straps, the casing having at least one other side including supporting structure for engaging said frame and wherein the supporting structure of said casing for engaging said frame comprises a set of holes in the at least one other side of the box-like casing for receiving an end portion of said frame.

15. The apparatus of claim 10 wherein the frame comprises a perimeter-defining element having two end portions adjacent to each other adapted to be coupled to the support and the sheet material comprises a fabric material including a plurality of straps for connecting the fabric material sheet to the frame.

16. Apparatus for use with a light source including a ring reflector having an rim projecting outwardly from the light source for directing light from the source in a first direction, the apparatus comprising:
    a support, and a frame connected to the support and adapted to extend over said ring reflector to support a sheet of material in a position relative to the light source to redirect a substantial portion of the light from said first direction to a second direction, a strap having two leg portions joined together by a bight portion, the two leg portions terminating at a first end coupled to the support so that the leg portions extend laterally on opposite sides of the ring reflector, each leg portion including a longitudinal slot for engaging said rim, the bight portion spacing the leg portions from each other by a distance less than a diameter of said rim, the leg portions being elastically displaceable to a distance greater than said diameter for engagement with the rim so that the apparatus is coupled in operative position relative to the light source.

17. The apparatus of claim 16 wherein the support comprises a box-like casing having a first two opposing sides engaging the first ends of the leg portions of straps, the casing having a second two opposing sides including a set of aligned holes for engaging the frame.

18. The apparatus of claim 16 wherein the frame comprises a perimeter-defining element having two end portions adjacent to each other adapted to be coupled to the support and the sheet material comprises a fabric material including a plurality of straps for connecting the fabric material sheet to the frame.

19. The apparatus of claim 16 further comprising a spill guard coupled to the bight portion of the strap for preventing the transmission of unreflected light from the light source in said second direction.

20. A method of coupling a substantially planar light reflector to a light source having a ring reflector including a rim projecting outwardly from the light source comprising the steps of:

a) providing a strap having two leg portions joined together by a bight portion, each of the two leg portions including a longitudinal slot and terminating at a first end that is coupled to a bracket, b) elastically displacing the straps outward by a distance sufficient to exceed a diameter of the rim to position the straps on opposite sides of the ring reflector so that the longitudinal slots are aligned with the rim, c) allowing the straps to elastically retract toward each other so that the rim of the ring reflector is received in the longitudinal slots, and d) coupling the substantially planar light reflector to the bracket to position the substantially planar light reflector over the light source so that a substantial portion of light emitted from the light source is redirected by the substantially planar light reflector.

* * * * *